United States Patent [19]
Nomura et al.

[11] Patent Number: 5,349,475
[45] Date of Patent: Sep. 20, 1994

[54] POSITION ADJUSTING APPARATUS OF ZOOM LENS BARREL

[75] Inventors: Hiroshi Nomura; Norio Sato; Nobuaki Aoki, all of Tokyo, Japan

[73] Assignee: Asahi Kogaku Kogyo Kabushiki Kaisha, Tokyo, Japan

[21] Appl. No.: 46,812

[22] Filed: Apr. 16, 1993

[30] Foreign Application Priority Data

Apr. 17, 1992 [JP] Japan ................... 4-098261

[51] Int. Cl.$^5$ .................................................. G02B 15/14
[52] U.S. Cl. .................................... 359/694; 359/700; 354/485; 354/403; 354/195.1; 354/195.12
[58] Field of Search ............... 359/693, 694, 698, 699, 359/700; 354/286, 485, 403, 195.1, 195.12

[56] References Cited

U.S. PATENT DOCUMENTS

| | | | |
|---|---|---|---|
| Re. 2,261 | 5/1993 | Haraguchi et al. | 354/403 |
| 4,936,664 | 6/1990 | Haraguchi et al. | 359/705 |
| 4,944,030 | 7/1990 | Haraguchi et al. | 354/403 |
| 4,967,218 | 10/1990 | Numako et al. | 354/195.1 |
| 5,012,273 | 4/1991 | Nakamura et al. | 354/485 |
| 5,016,032 | 5/1991 | Haraguchi et al. | |
| 5,051,764 | 9/1991 | Nomura et al. | 354/195.1 |
| 5,142,315 | 8/1992 | Haraguchi et al. | |
| 5,144,493 | 9/1992 | Nomura | 359/700 |
| 5,150,145 | 9/1992 | Haraguchi et al. | |
| 5,157,429 | 10/1992 | Haraguchi et al. | |
| 5,162,831 | 11/1992 | Haraguchi et al. | 354/195.1 |
| 5,164,757 | 11/1992 | Nomura | 354/403 |
| 5,214,462 | 5/1993 | Haraguchi et al. | |
| 5,262,898 | 11/1993 | Nomura | 354/195.11 |

*Primary Examiner*—Loha Ben
*Assistant Examiner*—Thomas Robbins
*Attorney, Agent, or Firm*—Sandler Greenblum & Bernstein

[57] ABSTRACT

An adjusting apparatus of a zoom lens barrel is provided including a zoom mechanism in which the zooming is carried out by a rotation of a rotatable cam ring, a code plate provided on a linearly movable member which is linearly moved in an optical axis direction by the zoom mechanism, and a brush holder having brushes which come into contact with the code plate to detect a focal length thereof. The adjusting apparatus further includes a brush position adjusting mechanism which adjusts the position of the brush holder in the optical axis direction, and a device for confirming that the cam ring, whose reference angular position is varied in accordance with the adjustment of the brush holder by the brush position adjusting mechanism, is located at a predetermined angular position.

15 Claims, 9 Drawing Sheets

POSITION ADJUSTING APPARATUS OF ZOOM LENS BARREL

BACKGROUND OF THE INVENTION

1. Field of the Invention

The present invention relates to an apparatus for adjusting a position of a zoom lens barrel in which the position of a cam ring can be checked.

2. Description of Related Art

For example, in a known zoom lens barrel having a cam ring which is rotated to effect the zooming, the focal length during zooming is detected by a zoom code plate provided on a stationary ring of the zoom lens, together with zoom brushes which come into slide contact with the zoom code plate in accordance with the rotation of the cam ring, thus producing electric signals corresponding to the focal length.

The zoom code plate is provided with a predetermined pattern of contacts (contact pattern). Upon zooming, the zoom brushes are rotated together with the cam ring to come into slide contact with the zoom code plate, so that digital signals corresponding to the focal length can be sent to a drive control circuit of the camera. Consequently, data (e.g., open F number) necessary to control the camera is selected from each of a plurality of data tables of variable information, and input to the drive control circuit of the camera body.

Consequently, in the known zoom lens barrel as mentioned above, it is absolutely necessary to accurately place the zoom code plate and the zoom brushes at respective predetermined positions (reference positions). Otherwise, it is impossible to determine the angular position of the cam ring relative to the stationary ring of the zoom lens, thus resulting in a failure to detect a correct focal length during zooming.

However, in a conventional zoom lens barrel, the zoom code plate is circumferentially secured to the outer peripheral surface of the stationary ring, and the zoom brushes secured to the cam ring are rotated on the zoom code plate in the circumferential direction of the stationary ring. Consequently, it is very difficult to establish an accurate and optimal relative position of the zoom code plate and the zoom brushes by a fine adjustment, for example, upon assembling.

SUMMARY OF THE INVENTION

The primary object of the present invention is to provide an adjusting apparatus which can easily adjust the position of zoom brushes relative to a zoom code plate, and in which an angular position of a cam ring can be accurately confirmed.

According to the present invention, there is provided an adjusting apparatus of a zoom lens barrel including a zoom mechanism in which the zooming is carried out by rotation of a rotatable cam ring, a code plate provided on a linearly movable member which is linearly moved in an optical axis direction by the zoom mechanism, and a brush bolder having brushes which come into contact with the code plate to detect a focal length thereof. The adjusting apparatus further includes a brush position adjusting mechanism which adjusts the position of the brush holder in the optical axis direction, and a confirmation means for confirming that the cam ring. whose reference angular position is varied in accordance with the adjustment of the brush holder by the brush position adjusting mechanism, is located at a predetermined angular position.

With this structure, the relative position of the zoom code plate and the zoom brushes can be easily adjusted until the cam ring location can be confirmed to be at a predetermined angular position.

Preferably, the brush position adjusting mechanism includes a spring device for biasing the brush holder to be spaced from a mounting member on which the brush holder is supported, and a set screw which fastens the brush holder to the mounting member against the spring device.

Preferably, the confirmation device includes a mark provided on a rear end face of the cam ring and a view window in which the mark appears only when the cam ring is located at the predetermined angular position.

Provision can also be made for a light intercepting plate provided at a rear end face of the lens barrel. The view window can be formed in the light intercepting plate.

In one alternative, the light intercepting plate is provided with an insertion hole in which a rotating tool for rotating the adjusting screw can be inserted. The mark provided on the rear end face of the cam ring can include of two circles which are arranged side by side in the circumferential direction of the cam ring.

Preferably, the view window is in the form of an arch-shape extending in the circumferential direction of the cam ring, so that both the two circles can simultaneously appear in the view window. For example, the confirmation device confirms that the cam ring is located at a predetermined angular position when both of the two circles of the mark appear in the view window.

The present disclosure relates to subject matter contained in Japanese Patent Application No. HEI 4-98261 (filed on Apr. 17, 1992) which is expressly incorporated herein by reference in its entirety.

BRIEF DESCRIPTION OF THE DRAWINGS

The present invention will be discussed below in with reference to the accompanying drawings, in detail which.

DESCRIPTION OF THE PREFERRED EMBODIMENT

Figure 10:
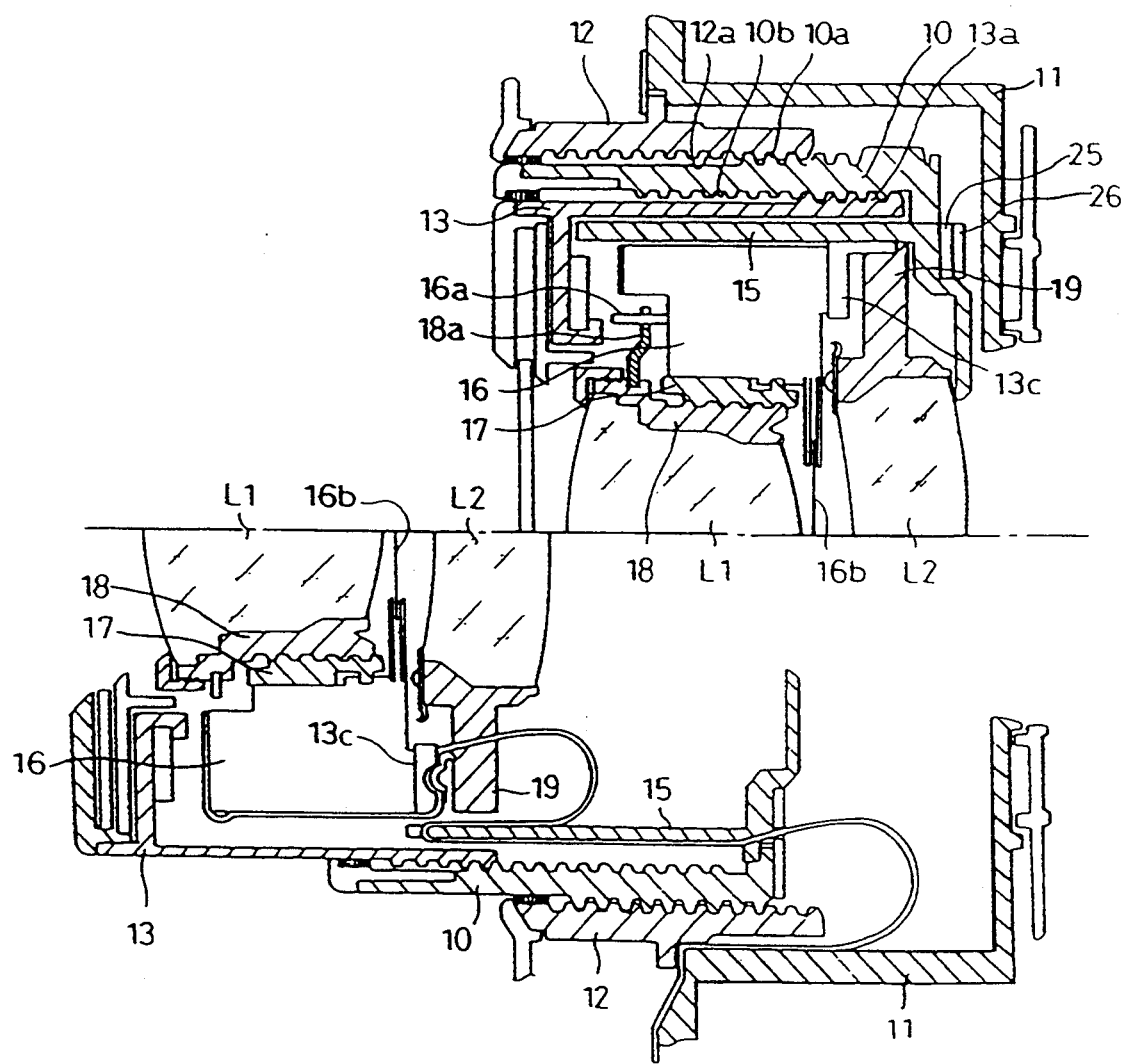
FIG. 10 is a sectional view of a zoom lens barrel to which a rotation feed mechanism can be applied.
Figure 11:
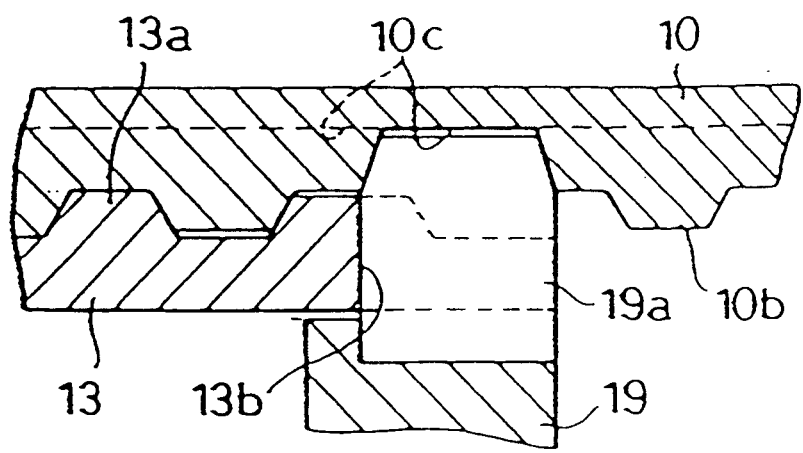
FIG. 11 is a sectional view of the main parts of a zoom lens barrel shown in FIG. 10; and, FIG. 12 is an exploded isometric view of the zoom lens barrel shown in FIG. 10.

A zoom lens barrel to which the present invention is applied is generically discussed below with reference to FIGS. 10 and 12.

A stationary lens barrel 11 integral with a camera body is provided with a helicoid ring 12 secured thereto, which is provided with a multiple female thread 12a in which a multiple male thread 10a formed on an outer periphery of a cam ring 10 is screw-engaged. The cam ring 10 is provided on an inner peripheral surface thereof with a multiple female thread 10b and an inner cam groove 10c. A multiple male thread 13a of a front lens barrel 13 is screw-engaged in the multiple female thread 10b Light intercepting plates 25 and 26, having openings 25d and 26d respectively. corresponding to an aperture of the camera body, are provided behind the rear end of the cam ring 10. The light intercepting plates 25 and 26 are provided on the upper ends thereof with positioning recesses 25a and 26a, so that a guide portion 23b of a linear movement guide 23, secured to the camera body, can be fitted in the positioning recesses 25a and 26a of the light intercepting plates and 26, and in a positioning recess 15b provided on a linear movement guide ring 15. The light intercepting plates 25 and 26 are secured to the linear movement guide ring 15, so that the positioning recesses 25a and 26a of the light intercepting plates 25 are aligned with the positioning recess 15b of the linear movement guide ring 15. The cam ring 10 is rotatably fitted on the linear movement guide ring 15. The linear movement guide 23 is secured securing members 24 and to the camera body by set screws 22, so that the guide portion 23b of the linear movement guide 23 extends in an optical axis direction.

A shutter holding frame 13c, to which a rear end of an annular shutter unit 16 is secured, is secured to the front lens barrel 13. The shutter unit 16 is provided on an inner peripheral surface thereof with a helicoid ring 17 integral therewith, which is screw-engaged by a front lens frame 18 which holds a front lens group L1. The shutter unit 16 has a drive pin 16a which is engaged by a driven pin 18, provided on the front lens frame 18 integral therewith.

As is well known, the drive pin 16a is rotated in accordance with an object distance signal sent from an object distance meter (not shown), so that the rotation of the drive pin 16a is transmitted to the front lens frame 18 through the driven pin 18a. As a result, the front lens frame 18, and accordingly the front lens group L1 are moved in the optical axis direction while being rotated to effect the focusing. The shutter unit 16 opens and closes shutter blades 16b in accordance with a brightness signal of an object to be taken. In FIG. 12, numeral 13f designates an aperture of the front lens barrel 13.

A rear lens frame 19, which holds a rear lens group L2. has a cam pin 19a which projects in the radial direction and which is fitted in the inner cam groove 10c of the cam ring 10. The rear lens frame 19 and the shutter holding frame 13c are guided by linear movement guide surface plates 15a provided on the linear movement guide ring 15, so as to linearly move. The linear movement guide surface plates 15a of the linear movement guide ring 15 can be engaged by corresponding linear movement guide surface plates 19b of the rear lens frame 19, as shown in FIG. 12.

The cam pin 19a of the rear lens frame 19 is fitted in a recess 13b formed on a rear end surface of the front lens barrel 13 in an assembly. Consequently, when a multiple male thread 13a of the front lens barrel 13 is screw-engaged in the multiple female thread 10b of the cam ring 10, the cam pin 19a is fitted in the inner cam groove 10c. Upon completion of assembling, the front lens barrel 13 and the rear lens frame 19 are independently moved in the optical axis direction in accordance with the multiple threads 10b and 13a and the cam groove 10c, respectively, when the rotation of the cam ring 10 takes place.

Namely, in the zoom lens barrel as constructed above, when the cam ring 10 is rotated, the cam ring 10 is moved in the optical axis direction in accordance with the engagement of the multiple threads 10a and 12a. At the same time, the front lens barrel 13, and accordingly, the front lens group L1 are linearly moved in the optical axis direction in accordance with the screw-engagement of the multiple threads 10b and 13a, and with the linear movement guide mechanism of the shutter holding frame 13c and the linear movement guide ring 15 (mounting member, linear support barrel). Furthermore, when the cam ring 10 is rotated, the rear lens frame 19, and accordingly, the rear lens group L2 are moved in the optical axis direction in accordance with the engagement of the inner cam groove 10c of the cam ring and the cam pin 19a of the rear lens frame 19 and the linear movement guide mechanism of the rear lens frame 19 and the linear movement guide ring 15 to effect the zooming.

The cam ring 10 is provided on the rear portion thereof with a multiple male thread 10a and a plurality of parallel gears 10d, each consisting of a spur gear whose teeth are in parallel with the axis of the cam ring 10. The gears 10d are inclined in the same direction as the threads of the male thread 10a. Threads 10a' are provided between the adjacent gears 10d, respectively. Namely, one thread 10a' of the multiple thread 10a is provided between the two adjacent gears 10d. In other words, the multiple thread 10a is partly cut away in the circumferential direction so as to provide the threads 10a', so that the gears 10d are formed in the cut-away portions. In the illustrated embodiment, the multiple thread 10a consists of three threads, so that the gears 10d are provided in the cut-away portions of two of the three threads. The multiple thread 10a, threads 10a', and the gears 10d have the same axial lengths.

The helicoid ring 12 is provided on the inner peripheral surface thereof with a multiple female thread 12a and relief grooves (not shown), etc., corresponding to the multiple male thread 10a, threads 10a' and three gears 10d of the cam ring 10, respectively. Namely, when the cam ring 10 is rotated in accordance with the screw-engagement of the multiple thread 10a (threads 10a') and the multiple thread 12a, the gears 10d are moved in the relief grooves without making contact.

The helicoid ring 12 is provided on the peripheral surface thereof with a recess 12d, so that a pinion (not shown) provided in the recess 12d can be engaged by the gears 10d. The pinion has an axial length (width) large enough to engage with at least one of the three gears 10d during the full travel of cam ring 10. Nevertheless, the pinion engages only with the rearmost gear 10d and the frontmost gear 10d at a front extremity position and a rear extremity position of the cam ring 10 in the axial direction, respectively. The pinion is driven by a drive motor (not shown).

The following discussion will be directed to an adjusting device in the present invention.

The adjusting device includes of a zoom mechanism which is driven by the rotation of the cam ring 10 to carry out the zooming, and a zoom code plate 36 provided on the inner peripheral surface of the front lens barrel 13 (linearly moving member) which is linearly moved in the optical axis direction by the zoom mechanism. The adjusting device further includes a brush holder 40 which holds zoom brushes 41(brushes) which are brought into contact with the code plate 36 to detect the current focal length, and a brush adjusting mechanism which adjusts the position of the brush holder 40 in the optical axis direction. Consequently, a reference angular position of the cam ring 10 is varied in accordance with the adjustment of the position of the brush holder by the brush adjusting mechanism. Provision is also made for a cam ring detecting device for detecting that the cam ring 10 is located in a predetermined reference angular position.

Figure 8:
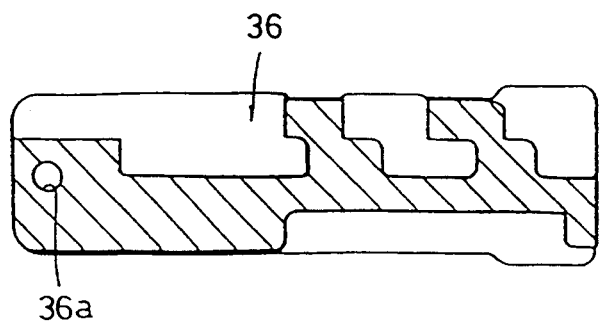
FIG. 8 is a sectional view of a zoom code plate according to the present invention.

As can be seen in FIG. 8, the code plate 36 is provided with a predetermined pattern of contacts. During the zooming, when the zoom code plate 36 is moved together with the front lens barrel 13 in the optical axis direction, the brushes 41 selectively come into contact with the contact pattern, so that the digital signals corresponding to the current focal length are output to a drive control circuit (not shown) of the camera. In accordance with the focal length data, control data is selected from the associated data tables of variable information.

The front lens barrel 13 is provided on the inner peripheral surface thereof with an insertion groove 13e extending in parallel with the optical axis O. The insertion groove 13e is provided, on the end thereof adjacent to the photographing aperture 13f, with an engaging projection 13d which is engaged in a positioning hole 36a formed in one end of the zoom code plate 36. The zoom code plate 36 is restricted in a direction parallel with the optical axis when the engaging projection 13d is fitted in the positioning hole 36a. The zoom code plate 36 is firmly adhered at the back surface thereof to the bottom of the insertion groove 13e.

Figure 9:
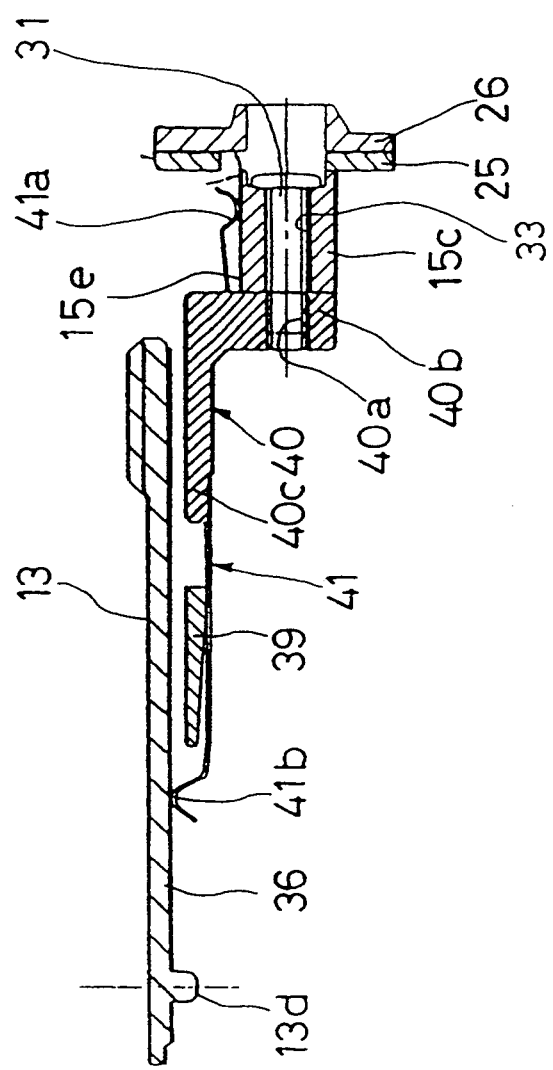
FIG. 9 is a side elevational view of a zoom code plate, zoom brushes and an adjusting mechanism thereof, according to the present invention.

The brush holder 40 is made of a generally L-shaped plate (side view) of synthetic resin, as shown in FIG. 9, and has an abutting portion 40b which is to come into contact with a supporting portion 15c of the linear movement guide ring 15, and a positioning portion 40c which is adapted to support and position the four brushes 41 corresponding to the contact pattern of the zoom code plate 36. The supporting portion 15c has an insertion hole 33 in which a set screw (adjusting screw) 31 is inserted. The abutting portion 40b has a threaded hole 40a corresponding to the insertion hole 33. The brushes 41 are provided on one end thereof with elastically deformable output terminals 41a which come into elastic contact with associated terminals 37a of a Flexible Printed Circuit (FPC) board 37 when the brush holder 40 is attached to the supporting portion 15c by the set screw 31. At the other ends of the brushes 41 are provided input terminals 41b which are brought into slide contact with the zoom code plate 36.

The supporting portion 15c is also provided with a spring insertion hole 32 adjacent to the screw insertion hole 33. The insertion hole 32 extends through the supporting portion 15c towards the abutting portion 40b, similarly to the screw insertion hole 33. A spacing spring (spring means) 30 is provided in the spring insertion hole 32 in a compressed state and contacts at one end with the brush holder 40 and at the other end with the light intercepting plate 26, respectively, so that the brush holder 40, supported by the supporting portion 15c, is biased by the spacing spring in the direction to come away from the supporting portion 15c.

In an assembled state in which the brush holder 40 is supported on the supporting portion 15c, when the set screw 31 is rotated to fasten or loosen the same, a slide movement of the brush holder 40 takes place in accordance with the angular displacement of the set screw (adjusting screw) 31, so that a relative position of the input terminals 41b, of the brushes 41 to the zoom code plate 36 can be adjusted. Namely, the spacing spring 30 which biases the brush holder 40 away from the supporting portion 15c, and the set screw 31, which mounts the brush holder 40 to the supporting portion 15c against the spacing spring 30, constitute a brush adjusting mechanism.

Figure 5:
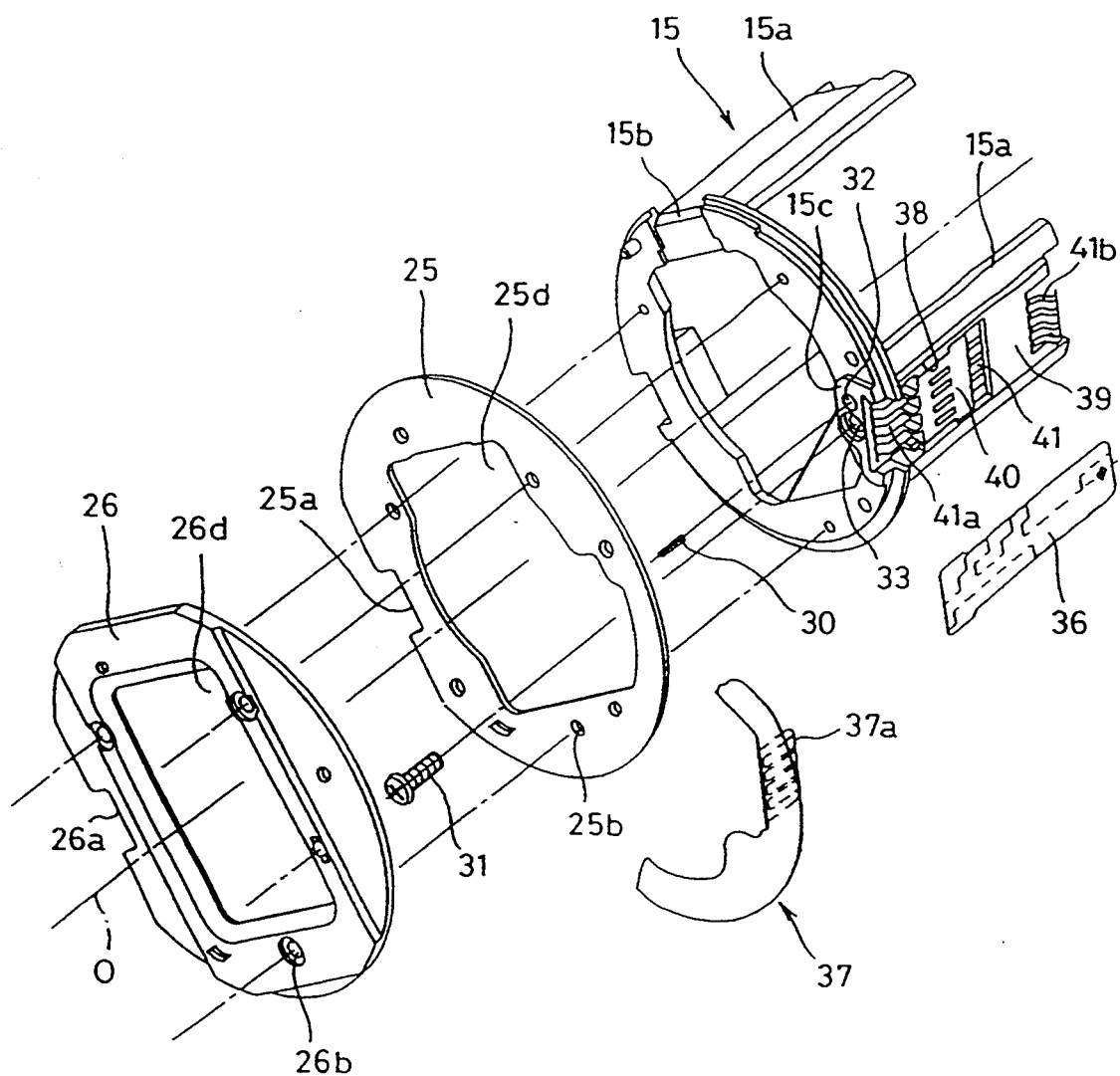
FIG. 5 is an exploded isometric view of an adjusting apparatus with a removed cam ring, viewed from another direction, according to the present invention.
Figure 6:
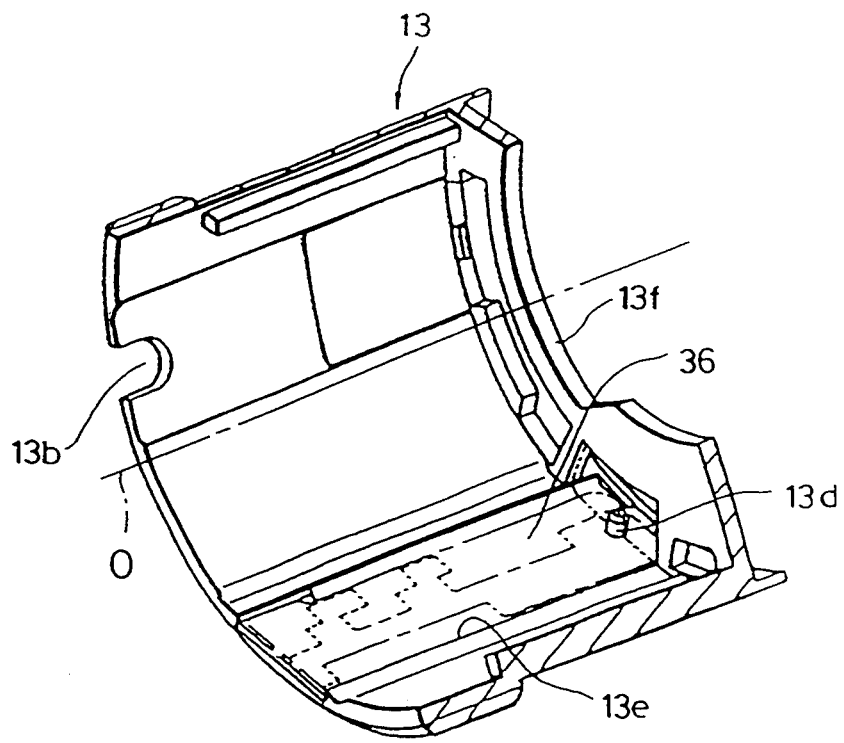
FIG. 6 is an isometric view of a zoom code plate provided on an inner peripheral surface of a front lens barrel, according to the present invention.
Figure 7:
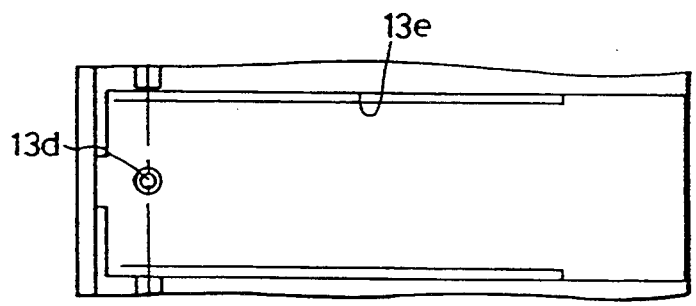
FIG. 7 is a plan view of the main parts of FIG. 6.

As can be seen in FIG. 5, the one of the three linear movement guide surface plates 15a that is provided with the supporting portion 15c is provided with a receiving groove 38 in which the brush holder 40 and the zoom brushes 41 are accommodated. The receiving groove 38 has a width substantially identical to the width of the brush holder 40. The one linear movement guide surface plate 15a is provided on the center portion thereof with a restriction wall 39 extending in the lateral direction of the receiving groove 38 to bridge the latter.

The supporting portion 15c is provided with an outer flat surface portion 15e (FIG. 9) on which the terminal portion 37a of the FPC board 37 is placed. The output terminals 41a of the brushes 41 elastically come into contact with the terminal portion 37a.

To mount the zoom brushes 41 to the receiving groove 38, the output terminals 41a are inserted onto the flat surface portion 15e, and thereafter, the brush holder 40 is fitted in the receiving groove 38, so that the portions of the brushes 41, close to the input terminals 41b thereof, bear against the rear surface of the restriction wall 39. The terminal portion 37a is inserted and held between the output terminals 41a and the flat surface portion 15e. Thus, the zoom brushes 41 can be easily and certainly connected to the FPC board 37 which is connected to the drive control circuit of the camera body.

Figure 12:
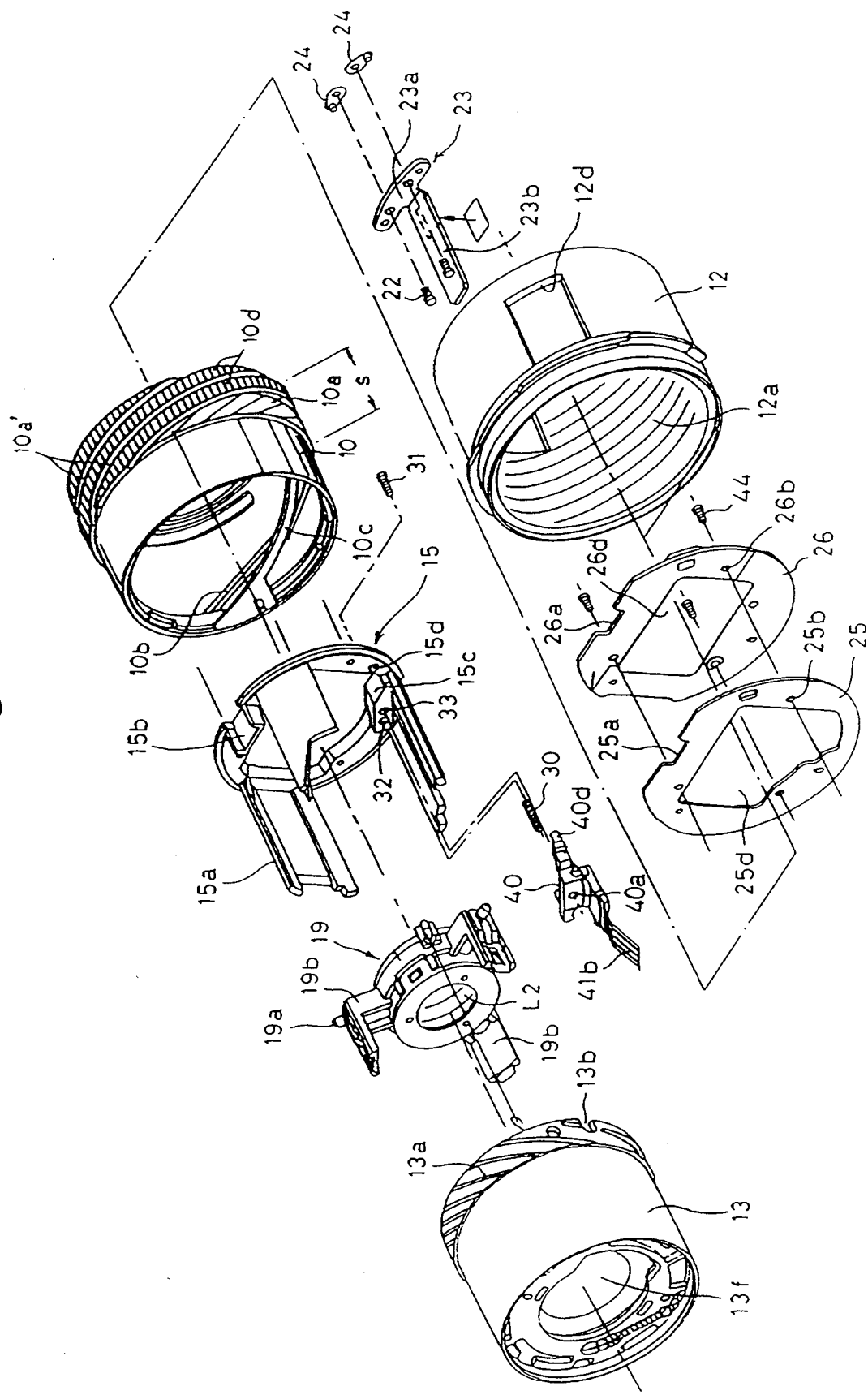

The supporting portion 15c, as shown in FIG. 12, is provided with right and left guide holes 15d in which right and left guide projections 40d, provided on the brush holder 40, are slidably inserted. Consequently, the input terminals 41b can slide smoothly on the zoom code plate 36 without changing the relative position therebetween in the direction perpendicular to the direction of the slide movement.

For a specific focal length, the position of the zoom code plate 36, relative to the zoom brushes 41 coming into slide contact with the code plate should always be the same according to design. If the relative position between the zoom brushes 41 and the linear movement guide ring 15. in the optical axis direction is different, for example due to a manufacturing error, etc., the relative position between the linear movement guide ring 15 and the zoom code plate 36 changes, thus resulting in an error of the angular position of the cam ring 10.

To prevent this, it is necessary to adjust and confirm the relative position of the zoom brushes 41 and the zoom code plate 36 in the optical axis direction in accordance with an appropriate position of the front lens barrel, for example, in the most contracted position of the lens barrel at which the cam ring 10 is at a predetermined angle position. To this end, in the present invention, provision is made for a cam ring detecting means for detecting or confirming the position of the cam ring 10.

The light intercepting plates 25 and 26 are secured to the linear movement guide ring 15 by set screws 44 (FIG. which are inserted in corresponding insertion holes 25b and 26b formed in the light intercepting plates 25 and 26, respectively, and are screwed in threaded holes 43 of the linear movement guide ring 15. The first light intercepting plate 25 has a view window 25e provided on the left side of the positioning recess 25a, and the second light intercepting plate 26 has a view window 26e corresponding to the view window 25e of the light intercepting plate 25.

The light intercepting plates 25 and 26 are shaped so that they are larger than the rear surface of the linear movement guide ring 15 and smaller than the contour of the cam ring 10. The view windows 25e and 26e correspond to the rear end surface 10e of the cam ring 10 and are substantially in the form of an arch-shape extending in the circumferential direction of the rear end surface 10e. The view windows 25e and 26e have a circumferential length so that both the two circles (points) of a mark 45 (discussed below) can simultaneously appear in the view window 25e (26e).

The cam ring 10 is provided on the rear end surface 10e thereof with a mark 45 represented by two circles (points) which appear in the view windows 25e and 26e only when the cam ring 10 is positioned in a predetermined correct angle position.

The two circles (points) of the mark 45 are located side by side in the circumferential direction of the cam ring 10 on the rear end surface 10e thereof. The two circles (points) of the mark 45 can be formed for example as two recesses which are formed integrally with the cam ring 10 by injection molding.

Figure 1:
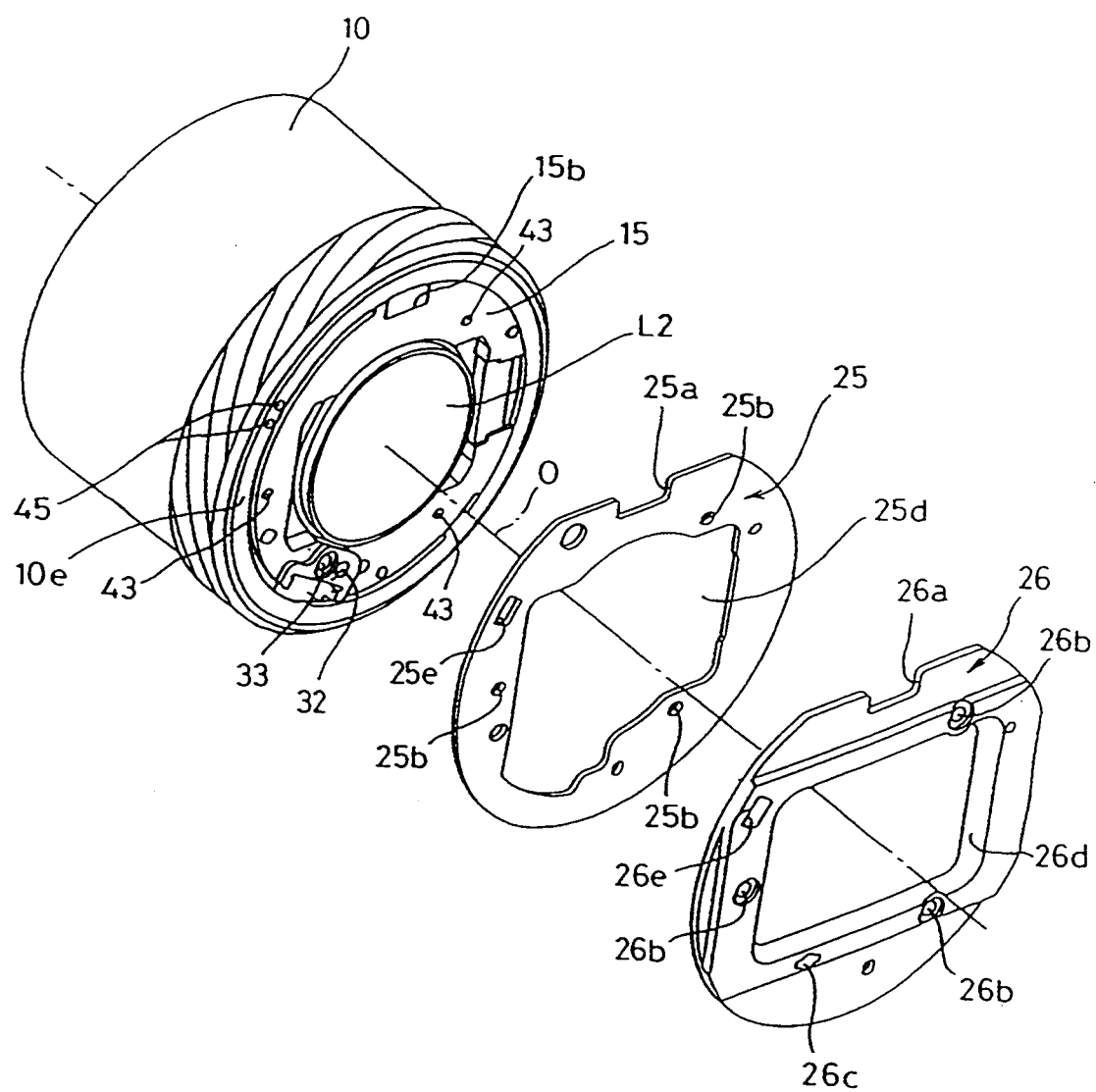
FIG. 1 is an exploded isometric view of main parts of an adjusting apparatus, according to the present invention.
Figure 2:
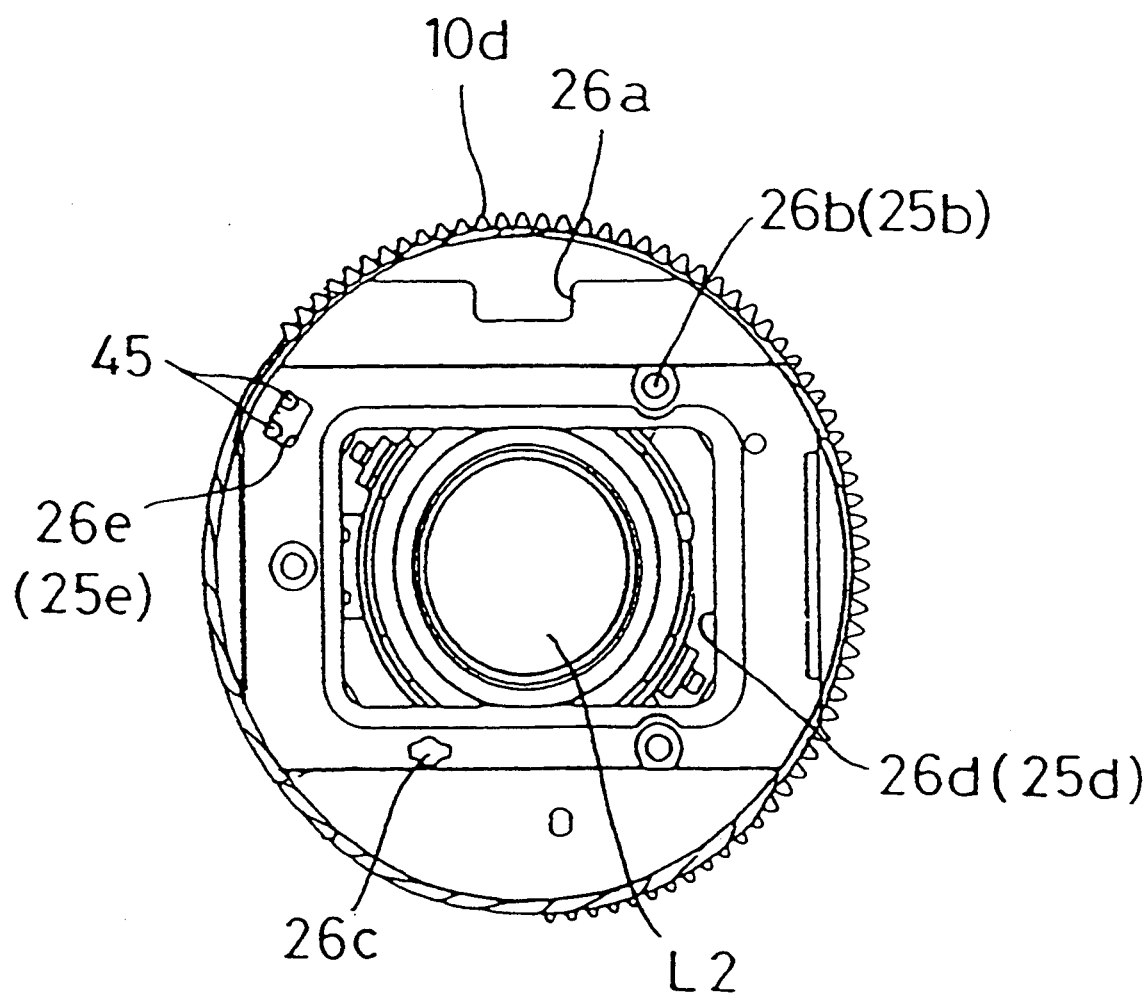
FIG. 2 is a back view of an assembled adjusting apparatus shown in FIG. 1.

When the linear movement guide ring 15 is correctly arranged in the camera body, the positioning recess 15b of the linear movement guide ring 15 is located at the upper and center portion thereof, as shown in FIGS. 1 and 2. In this state, for example upon assembling, the brush lo adjusting device can be manually actuated by rotating the set screw 31 in the screw insertion hole 33 in the clockwise or counterclockwise direction, using a screw-driver (not shown) which is inserted through the insertion hole 26c of the light intercepting plate 26.

When testing the relationship between the position of the zoom ring 10 and the relative position of the zoom brushes 41 and the zoom code plate 36. The camera body sub-assembly is placed in a test machine with a drive motor. The drive motor is driven in accordance with the manual movement, as described above, of the zoom brushes 41 relative to the zoom code plate 36. The motor in turn drives the cam ring 10 through the gears 10d.

Consequently, the cam ring 10 is moved in the optical axis direction while being rotated, in accordance with the engagement of the multiple threads 10a (10a') and 12a etc., to vary the relative position of the front lens group L1 and the rear lens group L2 to thereby carry out the zooming. Since the mark 45, provided on the rear end surface 10e of the cam ring 10, is exposed through the view window 26e when the input terminals 41b of the zoom brushes 41 are correctly positioned with respect to the code plate 36, the set screw 31 is to be rotated in the clockwise or counterclockwise direction by a screw-driver, while the view window 26e is observed until the two points of the mark 45 appear in the view window 26e, as shown in FIG. 2. Namely, when the two points of the mark 45 appear in the view window 26e, as shown in FIG. 2, the fact that the cam ring 10 is correctly positioned with respect to linear movement guide ring 15 can be confirmed.

Figure 3:
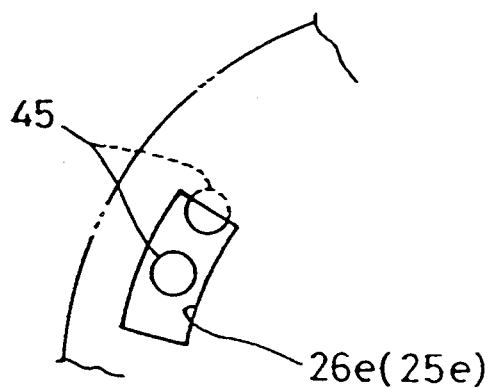
FIG. 3 is a schematic view of a mark of an adjusting apparatus which appears in a view window, according to the present invention.
Figure 4:
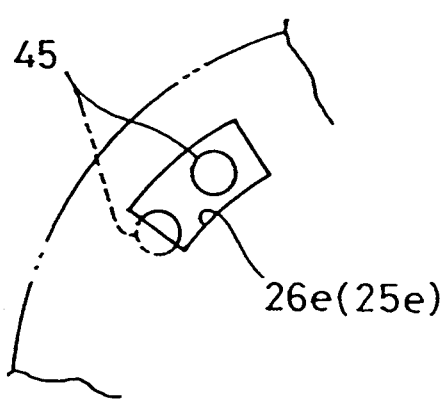
FIG. 4 is a schematic view of a mark of an adjusting apparatus which appears in a view window shown in a different position, according to the present invention.

It should be appreciated that it is not always necessary for the entirety of the two points of the mark 45 to appear in the view window to confirm that the cam ring 10 is correctly positioned, as shown in FIG. 2. Namely, when more than one-half the surface area of one of the two points of the mark 45 appears in the view window 26e and the other point entirely appears in the view window 26e, as shown in FIGS. 3 and 4, the cam ring 10 can be judged to be correctly positioned.

Note that the shapes of the mark 45 and the view window 26e (25e) are not limited to those in the illustrated embodiment. Namely, any confirming means for visually confirming or detecting the position of the cam ring 10 relative to the light intercepting plates 25 and 26, can be used in the present invention.

As can be understood from the above discussion, since an adjusting apparatus according to the present invention includes a zoom mechanism in which the zooming is carried out by rotation of a rotatable cam ring, a code plate provided on a linearly movable member which is linearly moved in an optical axis direction by the zoom mechanism, and a brush holder having brushes which come into contact with the code plate to detect a focal length thereof. The adjusting apparatus further includes a brush position adjusting mechanism which adjusts the position of the brush holder in the optical axis direction, and a confirmation device for confirming that the cam ring, whose reference angular position is varied in accordance with the adjustment of the brush holder by the brush position adjusting mechanism is located at a predetermined angular position. Due to the constructions of the adjusting apparatus, the relative position of the zoom code plate and the zoom brushes can be easily adjusted, and the location of the cam ring at a predetermined angular position can be easily confirmed.

Although the invention has been described with reference to particular means, materials and embodiments, it is to be understood that the invention is not limited to the particulars disclosed and extends to all equivalents within the scope of the claims.

We claim:

1. An adjusting apparatus of a zoom lens barrel comprising;
- a zoom mechanism in which the zooming is carried out by rotation of a rotatable cam ring;
- a code plate provided on a linearly movable member which is linearly moved in an optical axis direction by the zoom mechanism;
- a brush holder having brushes which come into contact with the code plate to detect a focal length thereof;
- a brush position adjusting mechanism which adjusts position of the brush holder in the optical axis direction; and, a confirmation means for confirming that the rotatable cam ring, whose reference angular position is varied in accordance with the adjustment of the brush holder by the brush position adjusting mechanism is located at a predetermined angular position.

2. An adjusting apparatus of a zoom lens barrel according to claim 1, wherein said confirmation means comprises a mark provided on a rear end face of the rotatable cam ring, and a view window in which the mark appears only when the rotatable cam ring is located at said predetermined angular position.

3. An adjusting apparatus of a zoom lens barrel according to claim 2 further comprising a light intercepting plate provided at a rear end face of the lens barrel.

4. An adjusting apparatus of a zoom lens barrel according to claim 3, wherein said view window is formed in the light intercepting plate.

5. An adjusting apparatus of a zoom lens barrel according to claim 4, wherein said light intercepting plate is provided with an insertion hole in which a rotating tool, for rotating an adjusting screw, can be inserted.

6. An adjusting apparatus of a zoom lens barrel according to claim 4, wherein said mark provided on the rear end face of the rotatable cam ring is comprised of two circles which are arranged side by side in a circumferential direction of the rotatable cam ring.

7. An adjusting apparatus of a zoom lens barrel according to claim 6, wherein said view window is in the form of an arch-shape extending in the circumferential direction of the rotatable cam ring, so that both the two circles can simultaneously appear in the view window.

8. An adjusting apparatus of a zoom lens barrel according to claim 7, wherein said confirmation means confirms that the rotatable cam ring is located at a predetermined angular position when both of the two circles of the mark appear in the view window.

9. An adjusting apparatus of a zoom lens barrel according to claim 1, wherein said zoom lens barrel comprises a front lens group and a rear lens group.

10. An adjusting apparatus of a zoom lens barrel according to claim 9, wherein said linearly movable member is a lens barrel which support said front lens group.

11. An adjusting apparatus of a zoom lens barrel according to claim 1, wherein said brush position adjusting mechanism comprises a spring means for biasing the brush holder to be spaced from a mounting member on which the brush holder is supported, and a set screw which fastens the brush holder to the mounting member against the spring means.

12. An adjusting apparatus of a zoom lens barrel for a camera comprising:
    a linear support barrel which is restricted from rotating with respect to a body of said camera;
    a plurality of lens groups which are linearly guided by said linear support barrel and move in an optical axis direction with respect to said linear support barrel;
    a cam ring which is rotatably fitted on said linear support barrel and moves said plurality of lens groups in a predetermined relationship in said optical axis direction by rotation thereof;
    a code plate which is provided on either one of said plurality of lens groups or said linear support barrel;
    at least one brush being provided on the other of said either one of said plurality of lens groups or said linear support barrel to detect a focal distance with said at least one brush contacting said code plate; and
    a means for adjusting the position of said at least one brush relative to said code plate.

13. An adjusting apparatus of a zoom lens barrel for a camera according to claim 12, further comprising;
    a light intercepting plate which is secured to a rear portion of said linear support barrel;
    wherein said cam ring is rotatable with respect to said light intercepting plate.

14. An adjusting apparatus of a zoom lens barrel for a camera according to claim 13, wherein said cam ring is provided with a mark in a rear surface thereof.

15. An adjusting apparatus of a zoom lens barrel for a camera according to claim 14, wherein said light intercepting plate has a see-through window portion through which said mark can be seen when the cam ring is in a predetermined rotational position with respect to said linear support barrel.

* * * * *

UNITED STATES PATENT AND TRADEMARK OFFICE
CERTIFICATE OF CORRECTION

PATENT NO.  : 5,349,475
DATED       : September 20, 1994
INVENTOR(S) : Hiroshi NOMURA et al.

It is certified that error appears in the above-indentified patent and that said Letters Patent is hereby corrected as shown below:

At column 8, line 58 (Claim 1, line 3), change "the zooming" to ---zooming---.

At column 8, line 66 (claim 1, line 11), change "adjusts" to ---adjusts a---.

At column 9, line 44 (claim 10, line 3), change "support" to ---supports---.

Signed and Sealed this

Ninth Day of May, 1995

Attest:

BRUCE LEHMAN

Attesting Officer     Commissioner of Patents and Trademarks